(12) United States Patent
Albers (10) Patent No.: US 8,066,135 B2
(45) Date of Patent: Nov. 29, 2011

(54) TRANSPORT DEVICE AND METHOD FOR TRANSPORTING FLUID

(75) Inventor: Hendrikus Johannes Maria Albers, Wageningen (NL)

(73) Assignee: Albers Alligator Projekten B.V., Wageningen (NL)

( * ) Notice: Subject to any disclaimer, the term of this patent is extended or adjusted under 35 U.S.C. 154(b) by 725 days.

(21) Appl. No.: 11/795,756

(22) PCT Filed: Jan. 18, 2006

(86) PCT No.: PCT/NL2006/000025
§ 371 (c)(1),
(2), (4) Date: Sep. 10, 2008

(87) PCT Pub. No.: WO2006/078155
PCT Pub. Date: Jul. 27, 2006

(65) Prior Publication Data
US 2009/0212550 A1    Aug. 27, 2009

(30) Foreign Application Priority Data
Jan. 24, 2005   (NL) ..................................... 1028100

(51) Int. Cl.
*B65D 88/00* (2006.01)
*B60P 3/00* (2006.01)
(52) U.S. Cl. .......................................... 220/1.6; 410/68
(58) Field of Classification Search .................... 220/1.6, 220/4.12, 4.16, 9.3; 410/68; 280/837
See application file for complete search history.

(56) References Cited

U.S. PATENT DOCUMENTS

| 3,025,073 | A | 3/1962 | Hickman |
| 3,510,142 | A | 5/1970 | Erke |
| 6,564,961 | B1 | 5/2003 | Klein |
| 6,609,863 | B1 * | 8/2003 | Morioka et al. ................ 410/68 |

FOREIGN PATENT DOCUMENTS

| CA | 1055445 | 5/1979 |
| DE | 11 45 498 | 3/1963 |
| DE | 199 34 803 | 2/2001 |
| FR | 1167358 | 11/1958 |
| FR | 1 257 065 | 3/1961 |
| FR | 1 508 174 | 1/1968 |
| FR | 2643344 | 8/1990 |
| GB | 2276591 | 10/1994 |
| GB | A-2 276 591 | 10/1994 |

OTHER PUBLICATIONS

Office Action for corresponding Canadian patent application No. 2,595,851 dated Aug. 10, 2011.

* cited by examiner

*Primary Examiner* — Harry Grosso
(74) *Attorney, Agent, or Firm* — Harness, Dickey & Pierce, P.L.C.

(57) ABSTRACT

An embodiment of the present invention discloses a transport device for transporting loose cargo and fluid, including: an elongate loading floor on which loose cargo can be placed; a fluid tank to be fixed releasably to the loading floor and in which fluid can be stored, wherein the tank can be folded in longitudinal direction over the loading floor between a collapsed state in which the tank takes up a minimum loading floor area, to enable transport of a relatively large quantity of loose cargo, and an expanded state to enable transport of a relatively large amount of fluid.

37 Claims, 5 Drawing Sheets

TRANSPORT DEVICE AND METHOD FOR TRANSPORTING FLUID

The present invention relates to a transport device and method for transporting loose cargo and fluid. The invention also relates to a fluid storage tank to be arranged in the transport device.

In the transport of goods by road and rail use can be made of different types of transport vehicle. For the transport of loose cargo use is generally made of trucks with a flat loading floor, onto which flat loading floor the goods can be placed. It is noted in this respect that loose cargo signifies any solid, non-fluid load. For the transport of fluids use is made of tanker trucks specially adapted for this application. Because different types of transport vehicle must also be used for transport of different types of goods, the situation may occur where transport vehicles for loose cargo or tankers must make part of a journey without cargo. This not only increases costs for the transporter, but also has an environmental impact. The truck does after all travel an unnecessarily large number of kilometers without cargo.

From the Netherlands patent NL 1 001 836 of applicant is known a truck which is provided with a fixed floor and a movable floor arranged above the fixed floor. The movable floor can be moved up and down, wherein a fluid chamber is formed between the movable floor and the fixed floor in the moved-upward position. This means that the truck can be converted between a configuration in which the vehicle can transport loose cargo when the movable floor is displaced downward, and a configuration in which fluid is transported when the movable floor is displaced upward.

A drawback of the known vehicle is however that it has a complex construction which is expensive and moreover takes up quite a lot of space, which is at the expense of the quantity of goods for transporting. The proposed provision of the movable floor and fluid reservoir is moreover arranged permanently in the vehicle so that, when the vehicle is used only for loose cargo for a determined time, it is not possible in a practical sense to remove the provision in order to ensure an optimal degree of loading of the vehicle.

A truck is known from the U.S. Pat. No. 3,025,073 which is provided with a collapsible and expandable tank for transporting, among other cargo, loose goods in the collapsed state and for transporting fluid in the expanded state. The tank is manufactured from plastic such as polyethylene or other light, strong, collapsible material, and is suspended from cables. In the suspended situation the tank can be expanded like an accordion by blowing air into the tank using a fan. Collapsing takes place by removing the air from the tank. In collapsed state the tank is protected in a protective cabinet arranged separately in the truck. A drawback of the known truck is that, in the situation in which the fluid tank is not being used it is stored in a protective cabinet arranged permanently in the truck. This means that a floor area of the truck potentially suitable for transporting loose cargo remains unused in such situations. This known truck therefore also has the drawback that it is not possible in a practical sense to remove the storage tank in order to ensure an optimal degree of loading of the vehicle.

It is an object of the present invention to provide an improved transport device and method for transporting loose cargo and fluid, wherein the above stated drawbacks are obviated.

According to a first aspect of the present invention there is provided for this purpose a transport device for transporting loose cargo and fluid, comprising:

- an elongate loading floor on which loose cargo can be placed;
- a fluid tank to be fixed to the loading floor and in which fluid can be stored, wherein the tank can be folded in longitudinal direction over the loading floor between a collapsed state in which the tank takes up a minimum loading floor area, to enable transport of a relatively large quantity of loose cargo, and an expanded state to enable transport of a relatively large amount of fluid;
- protective means for at least partly enclosing the fluid tank in the collapsed state for the protection thereof; wherein the protective means are integrated with the fluid tank and wherein the fluid tank and protective means are mounted releasably on the loading floor.

For transporting loose cargo the tank is wholly collapsed so that it only takes up a minimum loading floor area. In the collapsed state the protective means ensure that the rest of the tank is protected and cannot therefore be damaged. Because the tank together with the protective means is moreover releasable, the tank as a whole can be temporarily removed from the device so that the whole loading floor can be used for transport of loose cargo when for instance both the outward journey and the return journey involve loose cargo. This in respect of volume and tonnage/loading weight.

When fluid must be transported the tank is expanded over a large part of the surface of the loading floor. In the expanded state the tank can then be filled with the fluid for transporting, whereby the transport device is made suitable for transporting the fluid.

According to a preferred embodiment, the protective means of the expandable tank comprise a leading element, one or more intermediate elements and a rear element, and a flexible skin arranged between the leading and rear elements for enclosing the fluid for transporting, wherein the leading, intermediate and rear elements comprise peripheral parts which are embodied such that in the collapsed state they lie closely against each other in order to protect the skin of the tank. The application of a skin or bag, which is preferably constructed from fabric such as polyester or polyamide fabric provided with a flexible plastic or rubber coating, enables extremely compact collapsing of the tank. The leading, intermediate and rear elements protect the bag from outside influences in the collapsed position, while the elements also facilitate expanding of the bag and keeping it expanded and under constraint during transport.

According to a further preferred embodiment, the leading, intermediate and rear elements are embodied as rigid structural elements so that the skin or bag is well protected in the collapsed state, and a structurally strong construction is obtained in the expanded state which can sufficiently constrain the fluid during transport. This embodiment further increases the torsional resistance of the tank.

According to a further preferred embodiment, the transport device comprises blow-in means connectable to the tank for the purpose of at least partially expanding the tank by blowing in gas, preferably ambient air. The tank can hereby be partly or fully expanded in simple manner. In a further embodiment the transport device also comprises means with which air can be drawn out of the tank in order to collapse the tank. The blow-in means and blow-out means can be integrated in a single air unit.

According to a further preferred embodiment, each of the leading, intermediate and rear elements is provided with fixing means for fixing the elements to the loading floor. By fixing each of the elements to the floor a tank construction is obtained which is firm and safe in traffic during use.

According to a further preferred embodiment, the transport device comprises displacing means which can be fastened to at least one of the leading element, the rear element and the intermediate elements for displacing the elements between the expanded and collapsed state. In a determined embodiment the displacing means comprise at least one guide rail provided on a roof above the loading space, suspension elements which are displaceable in the guide rail and from which the tank can be at least partially suspended, and drive means for displacing the suspension elements in longitudinal direction of the loading floor. With such displacing means the collapsible tank can be collapsed and expanded quickly and easily.

According to a further preferred embodiment, the displacing means are also adapted to upwardly displace at least a part of the tank and to collapse or expand the relevant part of the tank in the upward displaced position. Once the tank has been wholly or partly lifted it can be expanded or collapsed more easily.

The displacing means for displacing a part of the tank in longitudinal direction and the displacing means for lifting the tank can be combined. In another embodiment however, there are provided lifting means for raising a lifting roof extending above the loading floor and displacing means for collapsing or expanding the tank in the raised position.

According to a preferred embodiment, the leading element, the intermediate elements and the rear element comprise peripheral edges which are embodied such that in the collapsed state they lie closely against each other and partially or, preferably, wholly enclose the bag. If said edges as well as the end surfaces of the leading and rear elements are embodied in strong material, for instance metal or plastic, they protect the bag against outside influences when the tank is in the collapsed state.

According to a further preferred embodiment, the transport device comprises centring means for placing the peripheral edges of said leading, rear and intermediate elements straight against each other.

According to a further preferred embodiment, the tank comprises strapping elements for strapping the tank on the sides, which in this manner forms a compact whole and continues to form a compact whole.

According to a further preferred embodiment, the transport device furthermore comprises a base plate provided under the tank in the collapsed state, which base plate can be fastened to the tank. When the elements are coupled to each other and the base plate is fastened to the tank, a package of relatively small dimensions is provided and the bag, when inside the package, is fully protected against outside mechanical influences, for instance damage resulting from transport of the tank.

According to a further preferred embodiment, the transport device comprises fixing means for fixing the tank relative to the loading floor. In a determined embodiment the fixing means comprise a number of feet which are provided on the underside of the leading, rear and intermediate elements and which can be placed close-fittingly in corresponding openings in the loading floor, and/or tensioning means which can be fastened to the tank for tensioning the tank in the expanded state. The combination of feet and tensioning means provides an adequate fixing of the tank relative to the loading floor which substantially follows the shape and position of the loading floor.

According to a further preferred embodiment, the intermediate elements are adapted to divide the tank into different compartments in the expanded state, wherein the intermediate elements are provided with one or more passage openings for distributing the fluid over the different compartments.

According to another preferred embodiment, the intermediate elements are adapted to divide the tank into different compartments closed off from each other in the expanded state so as to be able to arrange different fluids in the compartments.

According to a further preferred embodiment, the tank has a length in collapsed state of about 20% or less, preferably 10% or less, of the loading floor length. This means that a relatively large part of the loading floor can be made suitable for the transport of loose cargo.

According to a further preferred embodiment, the tank has a length in expanded state of at least 80% of the loading floor length. This means that a relatively large part of the loading floor can be made suitable for transporting fluid.

According to a further preferred embodiment, the transport device comprises a number of thermally insulating panels which can be placed between the leading, rear and intermediate elements for the thermal insulation of the content of the tank. The device is hereby made suitable for transporting cooled fluids or heated fluids. When the panels are no longer necessary, they can be removed and optionally stored on the loading floor such that they take up as little space as possible.

According to a further preferred embodiment, the loading floor is the loading floor of a truck or the loading floor of a trailer to be pulled by a truck. In another embodiment the loading floor is however formed by the bottom of a freight container. This latter embodiment provides the option of also making standard sea containers suitable for the transport of fluids. According to another preferred embodiment, the loading floor is the floor of a railway wagon.

According to another aspect of the invention, there is provided a method for transporting fluid cargo in a transport vehicle suitable for the transport of loose cargo, comprising of providing an expandable fluid tank provided with protective means;
  placing the fluid tank with protective means at a random position on the loading floor of the transport vehicle,
  expanding the tank over the loading floor,
  fixing the tank; and
  filling the tank with the fluid for transport.

Expanding of the tank preferably comprises of blowing gas, in particular ambient air, into the tank. The tank is for the most part expanded as a result of the pressure of the gas.

In a further preferred embodiment the expanding comprises of lifting at least a part of the tank from the loading floor, expanding the tank in the raised position, for instance by displacing the lifted part in lengthwise direction of the loading floor, and lowering the expanded tank onto the loading floor. In this manner the tank can be expanded easily and quickly. It will be apparent that a combination of the above stated blowing in of gas and lifting of at least a part of the tank can lead to good results. In such a case the first part of the expanding process takes place for instance by lifting a part of the tank or the whole tank and subsequently blowing in ambient air, whereby the tank is expanded in longitudinal direction.

Further advantages, features and details of the present invention will be elucidated on the basis of the following description of several preferred embodiments thereof. Reference is made in the description to the accompanying figures, in which.

Figure 1:
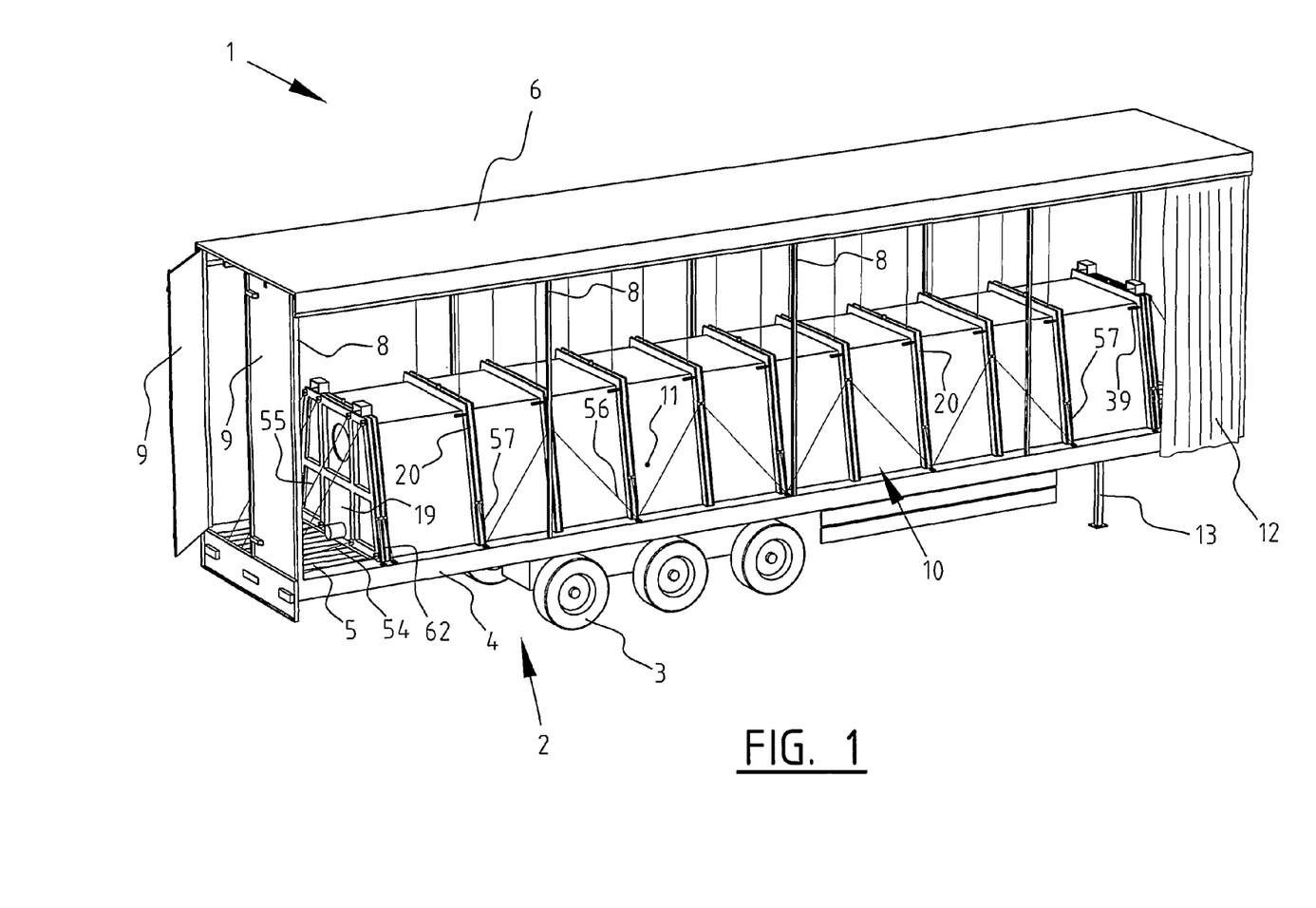
FIG. 1 shows a perspective view of a sliding tarpaulin trailer with a first preferred embodiment of the present invention in expanded state.

In the embodiment shown in FIG. 1 the invention is applied to a standard trailer suitable for loose cargo transport, more particularly a sliding tarpaulin trailer 1. Such a trailer 1 comprises a chassis 2 which is provided with a number of wheels 3 and a support 13 on which the chassis supports when the trailer is not attached to a truck or tractor. Chassis 2 further comprises a number of edge beams 4 between which a loading floor 5 is arranged. On the chassis is provided a number of posts 8 on which rests the roof 6 of the trailer. The inner space of trailer 1 can be accessed via two cover sheets or doors 9 provided on the rear side of the trailer, or from the sides via a slide-away tarpaulin 12. It will be apparent that the invention can also be applied to other types of vehicle, such as vehicles in which tarpaulin 12 is replaced by panels, trucks provided with their own loading space, trailers to which freight containers, for instance standard sea containers, can be fixed, railway wagons and so on, as long as there is a flat loading floor on which loose cargo can be placed.

Figure 2:
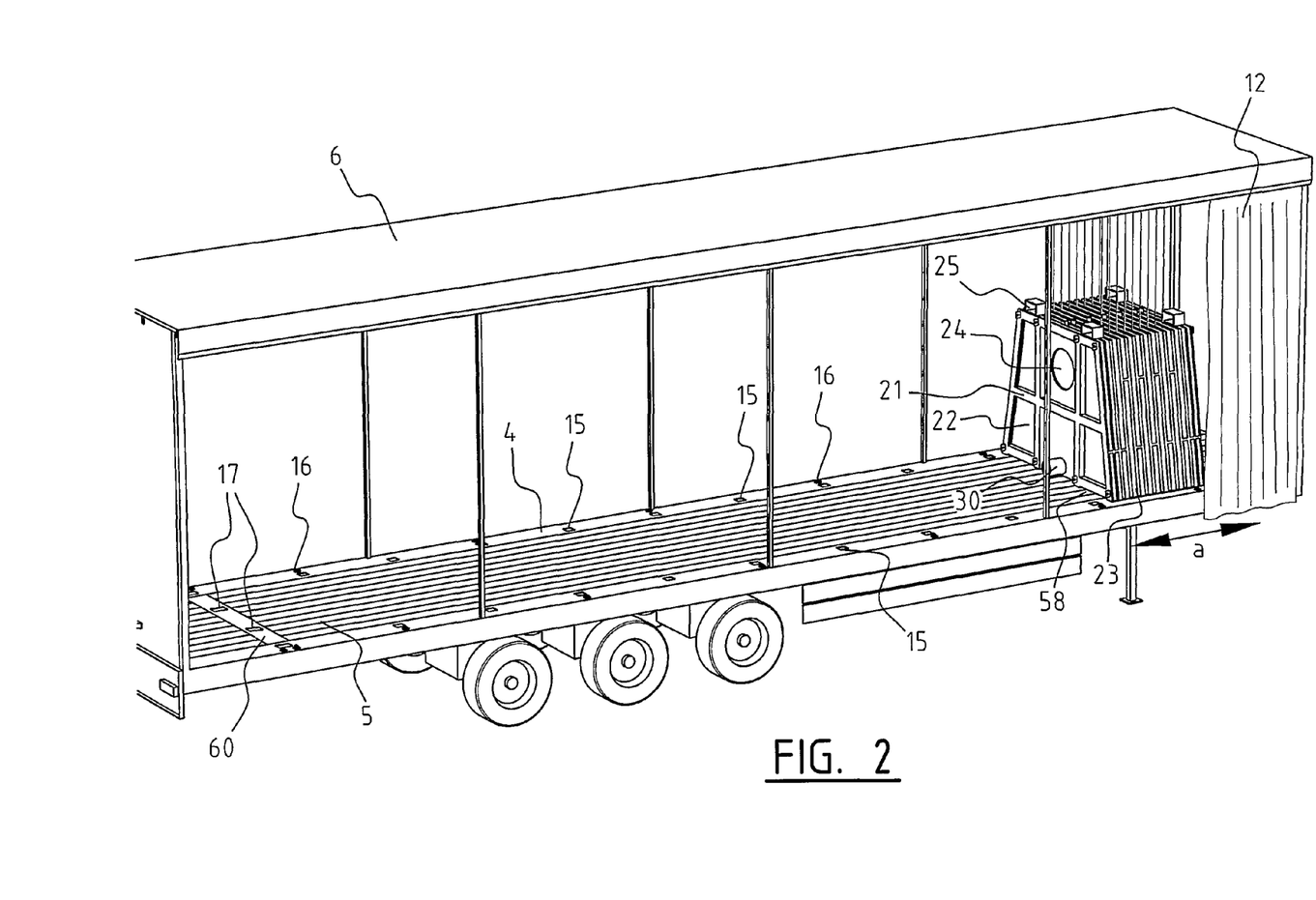
FIG. 2 is a perspective view of the embodiment shown in FIG. 1 in the collapsed state.
Figure 3:
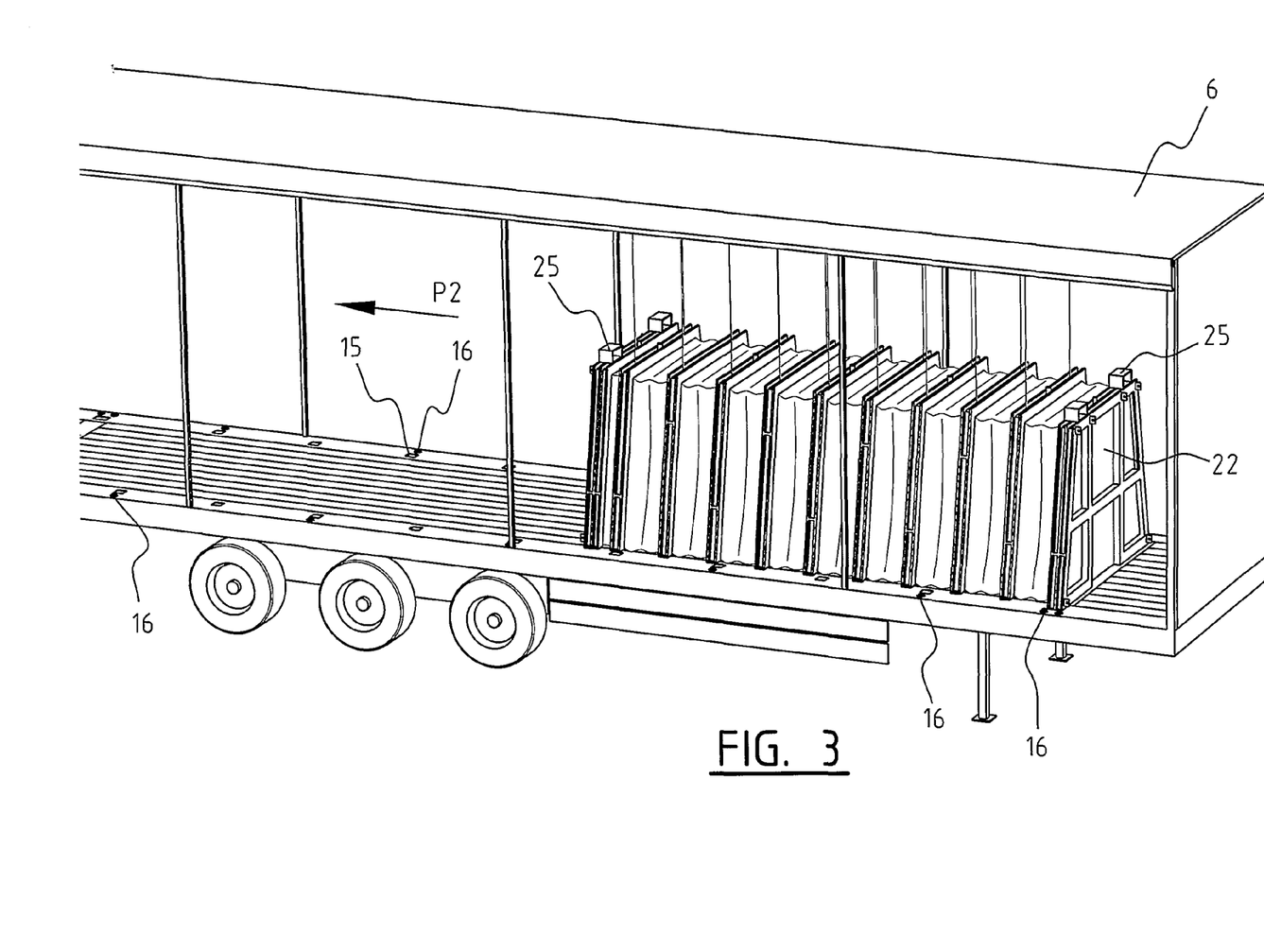
FIG. 3 shows a further perspective view of the embodiment of FIGS. 1 and 2 in semi-expanded state.

In the loading space of the trailer 1 shown in FIGS. 1-3 is arranged a preferred embodiment of a collapsible tank 10. FIG. 1 shows collapsible tank 10 in expanded state, wherein the greater part of loading floor 5 is covered by the tank, while FIG. 2 shows collapsible tank 10 in collapsed state, wherein the loading space is remains almost entirely clear. FIG. 3 shows a situation between the states shown in FIG. 1 and FIG. 2.

Collapsible tank 10 is constructed from a leading element 18, a rear element 19 and a number of intermediate elements 20 placed therebetween. Elements 18-20 take a rigid form and are for instance manufactured from steel. A flexible skin or bag 11 substantially under strain of tension is arranged between elements 18,19 and 20. The flexible skin is manufactured from coated fabric and is fixed on/to elements 18,19, 20 which are usually manufactured from metal. Bag 11 is given a flexible and waterproof form, for instance by constructing it from cloth strips welded or vulcanized watertightly together. The weight of the bag can vary, but in practice will usually lie between 100 and 250 kg.

Figure 4:
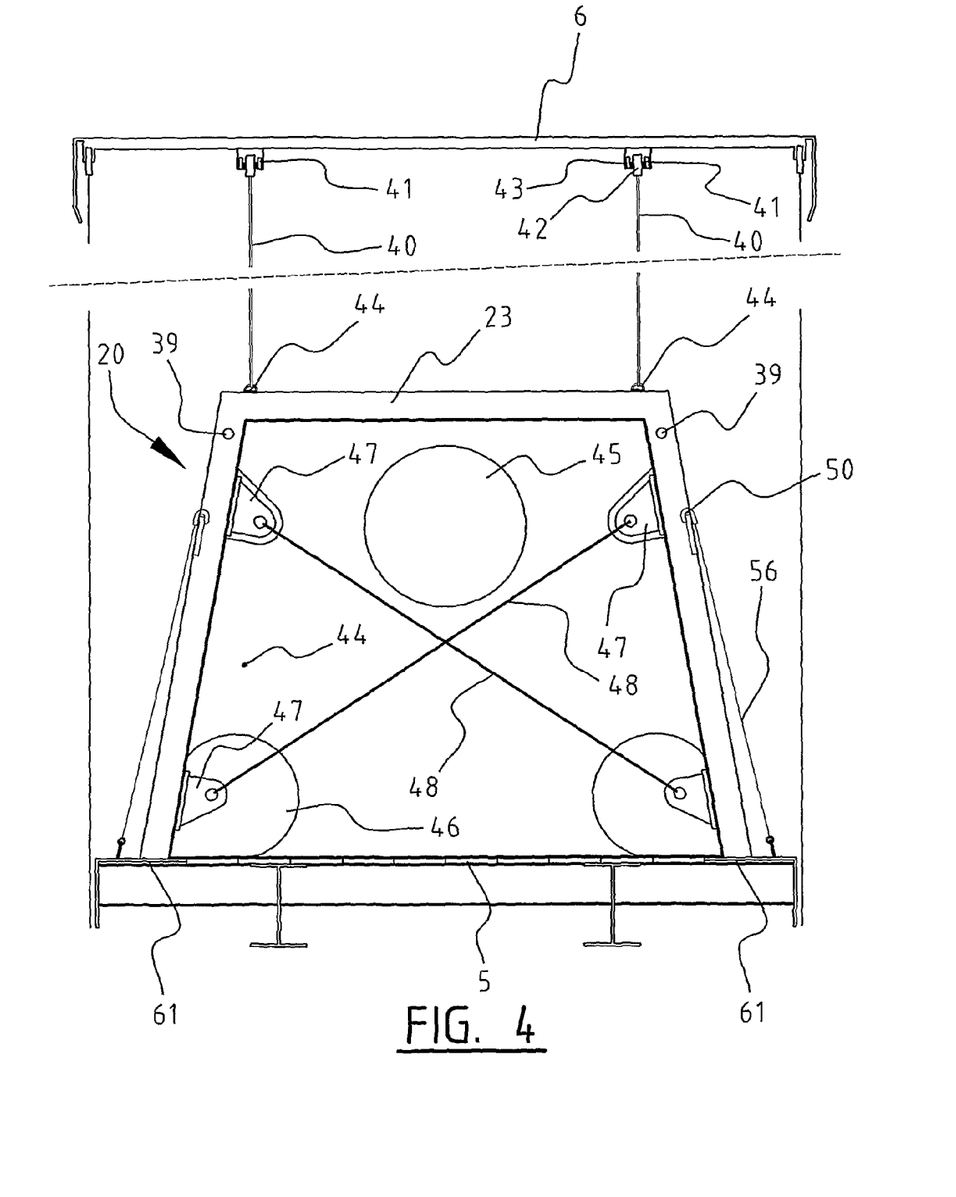
FIG. 4 shows a cross-section through the collapsable storage tank according to the invention.

FIG. 2 shows a situation in which tank 10 is supplied. In the collapsed state shown in this figure the leading and rear elements 18,19 and intermediate elements 20 are pressed against each other, this such that the outer sides 23 of elements 18,19,20 lie closely together. The elements are aligned using centring elements 39 (FIGS. 1 and 4). The elements can also be coupled to a pivotable metal base plate 58 provided on the underside of the collapsible tank. Base plate 58 is fastened releasably to the underside of elements 18,19,20. In the coupled situation all elements and the base plate independently form one whole which can be readily displaced by one operator using standard lifting equipment, such as a fork-lift truck, for instance by engaging the tank 10 at the position of brackets 25 provided on the upper side of elements 18,19. Since base plate 58, the sides 23 of elements 18,19,20 and plating 22 of the leading and the rear elements 18,19 form the six outer surfaces of the tank in the collapsed state, mechanical and other damage to the flexible part of the tank, i.e. the skin, is virtually precluded in the collapsed state.

In the situation shown in FIG. 2 the fluid tank is in the collapsed state and placed in the front part of trailer 1. Since tank 10 takes up a minimal loading area (length (a) about 1.3 m in a standard sliding tarpaulin trailer having a loading floor length of about 13.50 m), by far the greater part of loading floor 5 is available for the transport of loose cargo. It will be apparent that, if it is known beforehand that both the outward journey and the return journey of the trailer will entail the transport of loose cargo, collapsible tank 10 is removed from the trailer so that the entire loading floor 5 and the maximum tonnage are available.

Figure 5:
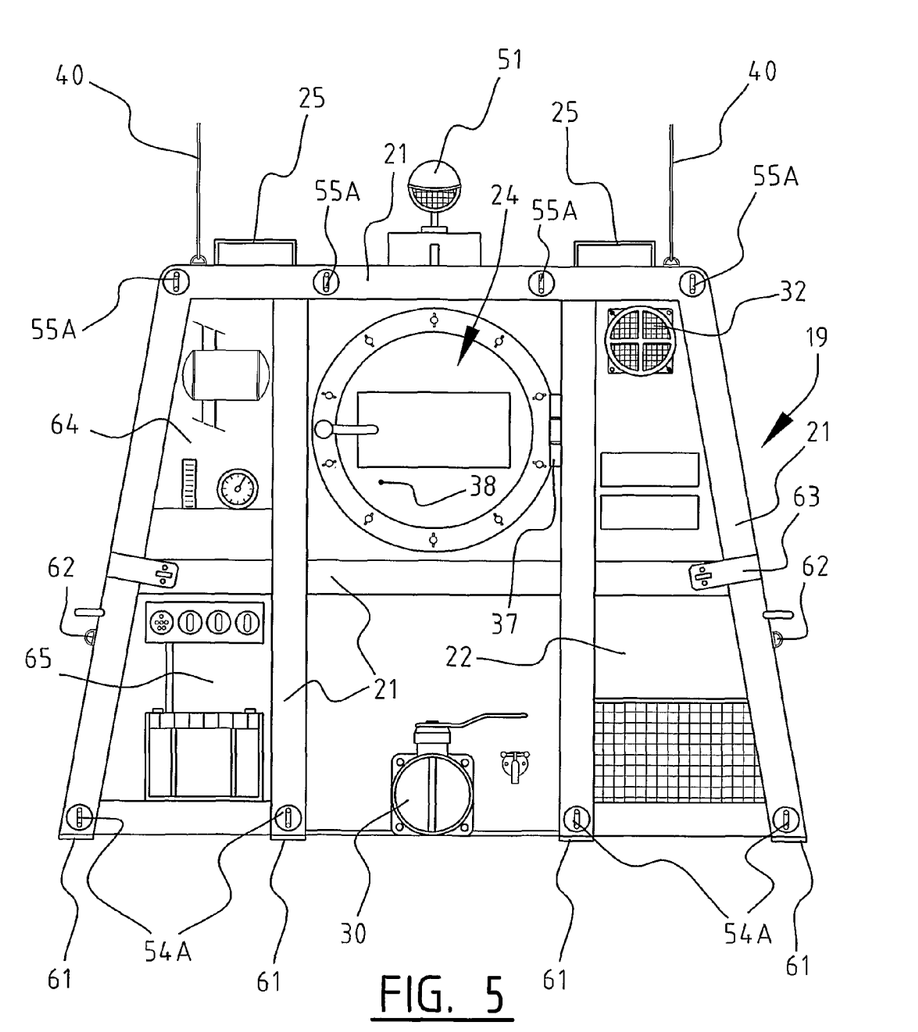
FIG. 5 is a view of the rear element of the embodiment shown in the foregoing figures.

When the collapsible tank must be expanded, it is connected at the rear end to an air unit 64 which blows in ambient air. Air unit 64 is powered by the electrical system of the truck or via a separate electric power supply 65 (FIG. 5). Tank 10 is as it were inflated by blowing in of the ambient air, whereby it is expanded in the manner of a concertina. FIG. 3 shows the situation in which the collapsible tank is expanded over several meters (for instance 6-10 m). In this situation the full volume inside the tank is however not yet available. The tank is expanded further using displacing mechanisms fixed to elements 18,19,20.

FIG. 4 shows a preferred embodiment of such a displacing mechanism. Provided on the upper side of elements 18,19,20 are eyes 44 on which cables 40 are arranged. Cables 40 are fastened to a transport member 42 which, using rollers 43, can be displaced along rails 41 extending in longitudinal direction of trailer 1. When at least a number of the elements 18,19,20 are each arranged in this manner on two transport members 42, the roof 6 of the trailer is raised slightly using means which are not shown, with the result that tank 10, or at least a part thereof, is lifted off loading floor 5. In the lifted state the rear part 19 and intermediate elements 20 are now displaced in rearward direction ($P_2$, FIG. 3) using air pressure, whereafter concertina tank 10 is expanded using a light winch construction (not further shown). When the tank is fully expanded the air supply is stopped and the tank is fixed to the trailer in the manner to be described below.

In another embodiment (not shown) the displacing mechanism is also suitable for lifting the tank 10 slightly, for instance by providing transport member 42 with a pulley and a lifting mechanism so that it is possible to suffice with a standard roof which is not displaceable in the height.

Fitting openings 15 are provided at regular intervals in edge beams 4 of the trailer and fitting openings 17 are provided in cross beams 60 at the front and rear of loading floor 5. In fitting openings 15,17 can be placed corresponding support feet 61 provided on the underside of each of the elements 18,19,20.

A number of tensioning elements are further provided for further fixation of tank 10 on trailer 1.

Provided first of all are tensioning elements 54 which engage at a low position on the rear side of the tank and which are fastened on one side to the bottom part 54A of frame 21 of rear element 19, and on the other side to a rear edge beam of the chassis of trailer 1. Secondly, tensioning elements 55 engaging at a high position are arranged on part 55A on the top side of frame 21 of rear element 19 and said rear edge beam of the chassis. Finally, tensioning elements 62 are provided on the sides. These tensioning elements 62 can be fastened to fastening points 16 provided in edge beams 4. In similar manner tensioning elements are provided on the other end surface of tank 10 for fixing leading element 18.

For fastening of intermediate elements 20, about eight tensioning elements 56 engaging at a high position on a fastening ring 50 and about five tensioning elements 57 engaging at a low position are arranged per side between a number of the intermediate elements 20 and the above stated fastening points 16. A correct fixation of the collapsible tank to the trailer can be effected by tightening all tensioning elements 54-57 and 62.

Fluid tank 10 is designed and constructed such that it can absorb all static and dynamic forces which can be caused by the fluid content, and can transfer these to loading floor 5 of trailer 1. Dynamic forces are understood to mean all forces resulting from loading and unloading of the cargo, driving with the cargo, i.e. accelerating, braking, negotiating bends and the like. The design and the construction of the trailer itself are such that it does not have to differ visually from a conventional trailer. This means that, once the sliding tarpaulins are closed or the side panels arranged, it is not possible to see from the outside of a trailer loaded with fluid that the trailer is functioning as a tanker.

After the journey in which fluid has been transported, tank 10 can be immediately refilled. This often happens after the tank has been washed clean internally and dried on the inside, for instance by blowing in ambient air using the above mentioned air unit and/or by controlled natural ventilation via the opened manholes provided in leading element 18 and rear element 19, the manhole in leading element 18 being connected to an air supply hose which is coupled at its other end to a closable opening with air filter in the front partition of the trailer. A controlled natural ventilation occurs during driving with the trailer and fluid tank in the expanded position.

If loose cargo must be transported in the subsequent journey, fluid tank 10 is collapsed once again. Collapsing of the tank can be carried out in reverse sequence to the expanding. For this purpose all fixing means are first released, the tank is lifted slightly and rear element 19 and intermediate elements 20 are then moved forward by creating a vacuum using an air unit. When rear element 19 and intermediate elements 20 are pressed tightly together and against leading element 18, elements 18,19,20 are centered together using the above mentioned centring elements 39.

The compact, folded-together whole of the fluid tank is further strapped horizontally on both sides using strapping elements 63 in order to retain a permanently compact unit. This unit can now be placed directly against the front partition of the trailer and lashed fixedly thereto.

The trailer is now ready for the transport of loose cargo, since by far the greater part of the loading floor is available. If however the whole loading floor 5 must be available for the transport of loose cargo, the fluid tank freely suspended from the roof is moved to the rear of the trailer, where tank 10 can be easily picked up using a fork-lift truck and removed from the trailer.

If use is made of a standard sliding tarpaulin trailer with dimensions of 13.65×2.55×4 meters, whereby about 32 tons of goods can normally be transported, a fluid tank can be realized with which about 30 tonnes of fluid can be transported in safe and operationally reliable manner. It is otherwise noted that fluid tank 10 can be used fully loaded, so completely filled. The tank can however also be used with partial loading, so for instance half-filled. At each level of loading the tank 10 meets the current requirements for loading, and the use of the tank can be classified as operationally reliable and safe.

FIG. 4 shows a cross-sectional view of an intermediate element, in which the construction of such an intermediate element 20 is shown in more detail. Intermediate element 20 comprises a metal frame 23, to the inside of which is fastened a partition 44, for instance manufactured from flexible cloth. A certain compartmentalization of the fluid in the tank can be achieved by providing a number of the intermediate elements 20 with such a partition 44. In the shown embodiment the partition is provided with passage openings 45 and 46 so that fluid can flow from the one compartment to the other. The compartmentalization enhances safety since it ensures that, for instance when the trailer brakes, the fluid will not flow forward too quickly and the occurring forces are partially transferred by partitions 44 to intermediate elements 20, tensioning elements 54-57 and 62, and therefore to the loading floor of the trailer. Passage openings 45 and 46 do however make it possible to fill or empty tank 10 on one side, for instance on the rear side, via a filling/draining opening 30. In another embodiment (not shown) partitions 44 are however completely closed, thus creating the separate compartments. When each of the compartments in this embodiment is provided with a separate filling/draining opening, different fluids can be transported in the compartments.

FIG. 4 also shows that elements 20 are provided with an internal reinforcement in the form of four flanges 47, between which two tensioning elements 48 are arranged in crosswise manner. These tensioning elements 48 absorb the lateral pressures which can occur during fluid displacement.

Finally, FIG. 5 shows a rear view of fluid storage tank 10 according to the invention. Shown in this embodiment is that element 19 is provided with a manhole 24, which can be sealed using a cover 38 which is pivotable via hinges 37. Manhole 24 is intended to allow an operator access to the inside of tank 10, for instance to enable thorough cleaning and inspection thereof, or to allow repairs to be carried out. The figure also shows an electric power supply 65, for instance constructed from one or more batteries and an associated electrical control system. The power supply can be used, among other purposes, for supplying electric power to air unit 64 and lighting unit 51, as shown in FIG. 5.

Although embodiments are drawn in the figures, the tank of which is placed at the front side of the loading floor, it will be wholly apparent from the foregoing that, as a result of the described claims, the tank can be placed at any other random position. It can be particularly recommended in the case of for instance sliding tarpaulin trailers, in which the loading floor is readily accessible over the full length, to place the collapsed tank in the centre or wholly to the rear of the loading floor, depending on the planned distribution of the load. This also makes it possible to place or remove the collapsed tank when the rest of the loading floor is loaded.

The present invention is not limited to the preferred embodiment thereof described herein. The rights sought are rather defined by the following claims, within the scope of which many modifications can be envisaged.

The invention claimed is:

1. Transport device for transporting loose cargo and fluid, comprising:
   an elongate loading floor on which loose cargo is placeable;
   a fluid tank, including fixing means for fixing the tank to the loading floor, fluid being storable in the tank, wherein the tank is foldable in longitudinal direction over the loading floor between a collapsed state, to enable transport of a relatively large quantity of loose cargo, and an expanded state to enable transport of a relatively large amount of fluid;
   protective means for at least partly enclosing the fluid tank in the collapsed state for the protection thereof, the protective means being integrated with the fluid tank, wherein the fixing means of the fluid tank and the integrated protective means are adapted so as to arrange the tank at any random position along the loading floor and so as to mount the fluid tank releasably on the loading floor so that the tank is completely removable from the device.

2. Device as claimed in claim 1, wherein, in the collapsed state, the protective means fully enclose the fluid tank.

3. Device as claimed in claim 1, wherein the protective means of the expandable tank comprise a leading element, one or more intermediate elements and a rear element, and a flexible skin arranged between the leading and rear elements for enclosing the fluid for transporting, and wherein the leading, intermediate and rear elements comprise peripheral parts which are embodied such that in the collapsed state, they lie closely against each other in order to wholly enclose the tank so as to protect the skin of the tank.

4. Transport device as claimed in claim 1, wherein the tank comprises at least one of a skin and a bag having a flexible and waterproof form.

5. Transport device as claimed in claim 1, wherein each of the leading, intermediate and rear elements is provided with fixing means for fixing the elements to the loading floor so that the tank may be arranged at any random position along the loading floor.

6. Transport device as claimed in claim 1, comprising centring means for centring the peripheral edges of said leading, rear and optional intermediate elements straight relative to each other.

7. Transport device as claimed in claim 1, wherein the tank comprises strapping elements for strapping the tank on the sides.

8. Transport device as claimed in claim 1, comprising a base plate provided under the tank in the collapsed state, which base plate is fastenable to the tank.

9. Transport device as claimed in claim 8, wherein the base plate, the sides of elements and plating of the leading and the rear elements form the six outer surfaces of the tank in the collapsed state.

10. Transport device as claimed in claim 3, wherein the leading, intermediate and rear elements are embodied as rigid structural elements.

11. Transport device as claimed in claim 5, wherein the fixing means comprise:
a number of feet, provided on the underside of the leading, rear and intermediate elements and which are placeable, close-fittingly, in corresponding openings in the loading floor.

12. Transport device as claimed in claim 5, wherein the fixing means comprise:
tensioning means, fastenable to the tank for tensioning the tank in the expanded state.

13. Transport device as claimed in claim 1, comprising blow-in means, connectable to the tank, for at least partially expanding the tank by blowing in gas.

14. Transport device as claimed in claim 1, comprising displacing means, fastenable to at least one of the leading element, the rear element and the intermediate elements, for displacing the elements between the expanded and collapsed state.

15. Transport device as claimed in claim 14, wherein the displacing means comprise:
a guide rail provided on a roof above the loading space;
suspension elements, displaceable in the guide rail and from which the tank is at least partially suspendable; and
drive means for displacing the suspension elements in longitudinal direction of the loading floor.

16. Transport device as claimed in claim 15, wherein the displacing means are also adapted to upwardly displace at least a part of the tank and to at least one of collapse and expand the relevant part of the tank in the upward displaced position.

17. Transport device as claimed in claim 1, further comprising lifting means for raising a lifting roof extending above the loading floor and displacing means for at least one of collapsing and expanding the tank in the raised position.

18. Transport device as claimed in claim 1, wherein the mutual distance between the intermediate elements in the expanded state is substantially equal.

19. Transport device as claimed in claim 17, wherein said peripheral edges, as well as the end surfaces of the leading and rear elements, are manufactured from structurally strong material.

20. Transport device as claimed in claim 1, wherein the intermediate elements are adapted to divide the tank into different compartments in the expanded state, and wherein the intermediate elements are provided with at least one passage openings for distributing the fluid over the different compartments.

21. Transport device as claimed in claim 1, wherein the intermediate elements are adapted to divide the tank into different compartments closed off from each other in the expanded state so as to be able to arrange different fluids in the compartments.

22. Transport device as claimed in claim 1, wherein the skin is constructed from fabric, provided with a flexible plastic coating.

23. Transport device as claimed in claim 1, wherein the skin is manufactured from a fabric with a flexible rubber coating.

24. Transport device as claimed in claim 1, wherein the tank has a length in collapsed state of about 20% or less of the loading floor length.

25. Transport device as claimed in claim 1, wherein the tank has a length in expanded state of at least 80% of the loading floor length.

26. Transport device as claimed in claim 1, comprising a number of thermally insulating panels, placeable between the leading, rear and possible intermediate elements, for thermally insulating the content of the tank from the environment.

27. Transport device as claimed in claim 1, wherein the loading floor is arranged on at least one of a truck and a trailer.

28. Transport device as claimed in any claim 1, wherein the loading floor is formed by the floor of a railway wagon.

29. Transport device as claimed in claim 1, wherein the loading floor is formed by the bottom of a freight container.

30. Collapsible tank comprising:
fixing means for fixing the tank to a loading floor, wherein fluid is storable in the tank and wherein the tank is foldable in longitudinal direction over the loading floor between a collapsed state, to enable transport of a relatively large quantity of loose cargo, and an expanded state to enable transport of a relatively large amount of fluid; and
protective means for at least partly enclosing the fluid tank in the collapsed state for the protection thereof, the protective means being integrated with the fluid tank, wherein the fixing means of the fluid tank and the integrated protective means are adapted so as to arrange the tank at any random position along the loading floor and so as to mount the fluid tank releasably on the loading floor so that the tank is completely removable.

31. Method for transporting fluid cargo in a transport vehicle suitable for the transport of loose cargo, comprising:
providing an expandable fluid tank integrated with at least one protective device to at least partly enclose the fluid tank in a collapsed state for the protection thereof;
placing the fluid tank with the integrated at least one protective device at a random position on a loading floor of the transport vehicle;
expanding the tank over the loading floor;

fixing the tank;

filling the tank with the fluid for transport; and removing the tank from the transport vehicle-after transport.

32. Method as claimed in claim 31, wherein the expanding includes blowing gas under pressure into the tank.

33. Method as claimed in claim 31, comprising emptying the tank and collapsing the tank.

34. Method as claimed in claim 33, wherein the collapsing includes creating a vacuum in the tank.

35. Method as claimed in claim 31, wherein the expanding includes lifting at least a part of the tank from the loading floor, expanding the tank in the raised position, and lowering the expanded tank onto the loading floor.

36. Method as claimed in claim 31, wherein the collapsing includes lifting at least a part of the tank, collapsing the tank in the raised position, and lowering the collapsed tank onto the loading floor.

37. Method as claimed in claim 31, applied in a collapsible tank comprising:

fixing means for fixing the tank to a loading floor, wherein fluid is storable in the tank and wherein the tank is foldable in longitudinal direction over the loading floor between a collapsed state, to enable transport of a relatively large quantity of loose cargo, and an expanded state to enable transport of a relatively large amount of fluid; and protective means for at least partly enclosing the fluid tank in the collapsed state for the protection thereof, the protective means being integrated with the fluid tank, wherein the fixing means of the fluid tank and the integrated protective means are adapted so as to arrange the tank at any random position along the loading floor and so as to mount the fluid tank releasably on the loading floor so that the tank is completely removable.

* * * * *